(12) United States Patent
Sasabe et al.

(10) Patent No.: US 6,765,029 B2
(45) Date of Patent: Jul. 20, 2004

(54) METHOD FOR PRODUCTION OF POROUS CROSS-LINKED POLYMER SHEET

(75) Inventors: Masazumi Sasabe, Kakogawa (JP); Katsuhiko Sakamoto, Izumisano (JP); Kozo Nogi, Kakogawa (JP); Motohiro Arakawa, Mino (JP)

(73) Assignees: Nippon Shokubai Co., Ltd., Osaka (JP); The Proctor & Gamble Company, West Chester, OH (US)

(*) Notice: Subject to any disclaimer, the term of this patent is extended or adjusted under 35 U.S.C. 154(b) by 77 days.

(21) Appl. No.: 10/149,820

(22) PCT Filed: Oct. 23, 2001

(86) PCT No.: PCT/JP01/09297

§ 371 (c)(1),
(2), (4) Date: Jun. 13, 2002

(87) PCT Pub. No.: WO02/34822

PCT Pub. Date: May 2, 2002

(65) Prior Publication Data

US 2003/0036575 A1 Feb. 20, 2003

(30) Foreign Application Priority Data

Oct. 24, 2000 (JP) ........................................ 2000-324551

(51) Int. Cl.[7] .............................. C08J 9/28; B29D 7/09; B29C 67/00
(52) U.S. Cl. .......................... 521/64; 521/79; 264/46.1; 264/45.9; 264/46.2; 264/46.4
(58) Field of Search .................... 521/64, 79; 264/46.1, 264/45.9, 46.2, 46.4

(56) References Cited

U.S. PATENT DOCUMENTS

| 5,249,372 A | 10/1993 | Wedel |
| 6,158,144 A | 12/2000 | Weber et al. |
| 6,299,808 B1 | 10/2001 | Mork et al. |

FOREIGN PATENT DOCUMENTS

| JP | 07-120145 | 5/1995 |
| WO | WO 86/06766 | 11/1986 |
| WO | WO 96/21681 | 7/1996 |
| WO | WO 97/18246 | 5/1997 |

Primary Examiner—Morton Foelak
(74) Attorney, Agent, or Firm—Fish & Richardson P.C.

(57) ABSTRACT

A method for dehydrating a porous cross-linked polymer conveniently to a low final water content is provided. A porous cross-linked polymer sheet is produced by a method which comprises causing a porous cross-linked polymer obtained by forming and polymerizing a water-in-oil type higher internal phase emulsion to be dehydrated by the use of non-woven fabric rolls furnished with an aspiration mechanism. Properly in this case, the porous cross-linked polymer is subjected to preliminary squeezing. In accordance with the present invention, a porous cross-linked polymer abounding in a water absorbing property to be dehydrated to a low final water content with a small number of rolls.

8 Claims, 4 Drawing Sheets

METHOD FOR PRODUCTION OF POROUS CROSS-LINKED POLYMER SHEET

TECHNICAL FIELD

This invention relates to a method for producing a porous cross-linked polymer sheet of an extremely small water content by dehydrating with a non-woven fabric roll a porous cross-linked polymer of a prescribed thickness obtained from a water-in-oil type high internal phase emulsion (hereinafter occasionally referred to simply as "HIPE").

BACKGROUND ART

As a technique for obtaining a porous substance formed of uniform open cells of a minute diameter, a method for producing a polymer by cross-link polymerizing an HIPE in the presence of a specific surfactant has been known. It is generally held that the term "HIPE" used herein refers to an emulsion so formed that the disperse phase accounts for a ratio exceeding 70 vol. % based on the total volume thereof [K. J. Lissant, Journal of Colloid and Interface Science, Vol. 22, 462 (1966)]. U.S. Pat. No. 5,334,621, for example, discloses a method for producing a porous cross-linked polymer by using such an HIPE (hereinafter referred to simply as "HIPE method").

This HIPE method produces a porous cross-linked polymer by preparing an HIPE containing (i) a polymerizing monomer mixture containing an oil-soluble vinyl monomer and a cross-linked monomer possessed of not less than two functional groups in the molecular unit thereof, (ii) a water phase accounting for 90 mass %, preferably 95 mass %, and particularly preferably 97 mass % of the emulsion, (iii) a surfactant such as a sorbitan fatty acid ester and a glycerol mono-fatty acid ester, and (v) a polymerization initiator and heating the HIPE till it polymerizes and forms a cross-link. According to this HIPE method, a porous cross-linked polymer formed of open cells in a reticular pattern is produced by virtue of reversed-phase emulsion polymerization. The porous cross-linked polymer which is obtained by the HIPE method, therefore, is possessed of such characteristic properties as low density, water absorbing property, water retaining property, heat insulation and soundproofing property.

The porous cross-linked polymer which is produced by the HIPE method described above, however, is disposed during the process of production to expose the formation of cells to the influence of the ratio of the water phase, i.e. an internal phase to the oil phase, i.e. an external phase, namely W/O, during the reversed-phase emulsion polymerization. An effort to obtain a porous cross-linked polymer having as large a void volume ratio as permissible inevitably results in increasing the water phase side numeral of the ratio W/O. The porous cross-linked polymer of this quality enjoys a large demand. The reason for this large demand is that when the porous cross-linked polymer has a large void volume ratio, it excels not only in absorbing property but also in heat insulating property and sound insulating property and, therefore, finds utility in various fields such as building materials, audio products, and horticultural articles. U.S. Pat. No. 5,334,621 mentioned above, for example, has a statement that the porous cross-linked polymer, when produced by the HIPE method, particularly preferably has a density of 97 mass % (W/O=33/1). Even generally, the W/O is actually attained more often than not in the range of 30/1–100/1. Specifically, an attempt to produce a porous cross-linked polymer by the HIPE method necessitates a large volume of water for the formation of an HIPE. This fact implies that when the porous cross-linked polymer is produced by the HIPE method, the produced porous cross-linked polymer is fated to contain water and, therefore, is required to be dehydrated and dried.

The dehydration of the porous cross-linked polymer which has been obtained by the polymerization of an HIPE is effected, as demonstrated in Example 2 cited in the official gazette of National Unexamined Patent Publication 2000-500,796, by nipping the polymer between paper towels and slowly squeezing it till the aqueous phase is removed.

The official gazette of National Unexamined Patent Publication HEI-11-503,177 discloses the dehydration which is effected by compressing an HIPE foam to expel the residual water therefrom or subjecting the foam and the water lodged therein together to a temperature in the approximate range of 60° C. to 220° C. or a microwave treatment, to vacuum dehydration, or to the combination of compression and thermal drying/microwave/vacuum dehydration. This compressive dehydration is accomplished by the compression which is produced with a series of paired porous nip rolls provided with a vacuum unit adapted to decrease the amount of the residual water phase to about three times the mass of the monomer which has been polymerized.

In the official gazette of WO86/06,766 is disclosed a liquid absorbing device which is used for removing a liquid from a given object for treatment containing the liquid. Specifically, this device is formed by wrapping a felt of excellent initial liquid absorbing power around the surface of a liquid absorbing roll and combining the liquid absorbing roll with an aspiration mechanism and is consequently enabled to utilize effectively the capillary effect originating in the numerous pores inherently possessed by a fibrous sheet, smooth the transfer of liquid, and exalt the liquid absorbing power and the property of retaining the liquid absorbing power.

The porous cross-linked polymer obtained by polymerizing an HIPE, however, has a high water content and is deficient in strength. When the foam and the porous cross-linked polymer obtained by polymerizing an HIPE which are disclosed in the official gazette of National Unexamined Patent Publication 2,000-500,796 and HEI-11-503,177 are dehydrated, therefore, they cannot be fully satisfactorily dehydrated or, when compelled to be sufficiently dehydrated, they possibly encounter fracture during the course of dehydration. The porous cross-linked polymer obtained by polymerizing an HIPE, though depending on the W/O ratio of the HIPE to be used, has a water content reaching a level in the range of 300–25,000 (w/w)% based on the mass of the polymer and, therefore, is particularly deficient in mechanical strength. Once the compressing operation of a metal roll inflicts a crack on the surface of the product for contact with the roll, this crack will form a cause for lowering the rating of the product in appearance. Further, when the product happens to sustain a crack or a bend, for example, this damage will form a cause for degrading the water absorbing property which the product is inherently required to possess and will possibly induce degradation of the quality of the product in terms of function.

Further, for the purpose of allowing a salt capable of stabilizing emulsification during the formation of an HIPE to be incorporated in the water phase thereby enabling the emulsification to proceed smoothly, such an electrolyte as calcium chloride is added to the emulsion. When the dehydration resorts solely to the use of a porous nip roll furnished with an aspiration mechanism, therefore, the roll is suffered to gather dirt on the surface thereof and the pores in the roll are clogged with dirt possibly to the extent of degrading the capacity of dehydration and interrupting the operation of dehydration because the sparingly soluble precipitate and the unaltered monomer are also subjected to dehydration. This interruption of the dehydrating operation forms a cause for inducing degradation of the efficiency of production particularly when the porous cross-linked polymer is continuously produced at a high speed.

An object of this invention, therefore, is to provide a method for causing a porous cross-linked polymer obtained by polymerizing an HIPE to be dehydrated without inflicting any damage on the polymer and a method for producing a porous cross-linked polymer sheet allowing a dehydrating treatment to be performed continuously and smoothly thereon.

DISCLOSURE OF THE INVENTION

This invention has been perfected based on the discovery that when a porous cross-linked polymer obtained by polymerizing an HIPE is dehydrated by a treatment using to a non-woven fabric roll and an aspiration mechanism in combination, a polymer sheet free from such damage as fold and crack can be produced with very high efficiency.

Specifically, this invention is accomplished by the following item (1).

(1) A method for the production of a porous cross-linked polymer sheet, comprising the steps of forming and polymerizing an HIPE thereby obtaining a porous cross-linked polymer and dehydrating the porous cross-linked polymer by using a non-woven fabric roll furnished with an aspiration mechanism.

In accordance with this invention, the use of non-woven fabric rolls furnished with an aspiration mechanism enables a porous cross-linked polymer to be dehydrated to an extremely low water content. In order for the conventional method to acquire this low water content, it generally necessitates an increase in the linear pressure of roll and consequently induces the porous cross-linked polymer to sustain fracture. In this invention, however, by particularly specifying the thickness of the porous cross-linked polymer, it is made possible to dehydrate the polymer sheet thoroughly to the center thereof with unusually high efficiency.

1—Roll proper, 2—porous, 3—flange, 4—non-woven fabric in the shape of a disc, 5—endless mesh belt, 101—HIPE, 102—Porous cross-linked polymer, 119—RIPE supplying device, 201—endless belt type conveyor (furnished with drive conveying device), 203, 205—sheet material, 207, 208—unwinding roller, 209, 211—roller, 212, 213—rewinding roller, 215—polymerization furnace, 217—heating means, 219—heating means (hot water shower), 301—non-woven fabric roll furnished with aspiration mechanism, 302—transporting conveyor, 303—dehydrating device, 402—band knife, 401—slicer, 403, 405—transporting conveyor

BEST MODE OF EMBODYING THE INVENTION

This invention primarily concerns a method for the production of a porous cross-linked polymer sheet, comprising the steps of forming and polymerizing a water-in-oil type high internal phase emulsion thereby obtaining a porous cross-linked polymer and dehydrating the porous cross-linked polymer by using a non-woven fabric roll furnished with an aspiration mechanism.

While the dehydration contemplated by this invention is characterized by using a non-woven fabric roll furnished with an aspiration mechanism, particularly by forming a coat of non-woven fabric on the surface of the nip rolls, it is made possible to attain instantaneous removal of the water expelled by compression. Especially, the porous cross-linked polymer itself is friable because it contains a large volume of water. When the linear pressure of the rolls is heightened for the sake of dehydration, therefore, the polymer possibly sustains a crack or collapses readily. In the present invention, however, by using a non-woven fabric on the surface of the nip rolls, it is made possible to secure fully satisfactory initial absorbing power which enables the porous cross-linked polymer to be very efficiently dehydrated without infliction of any fracture.

Figure 1:
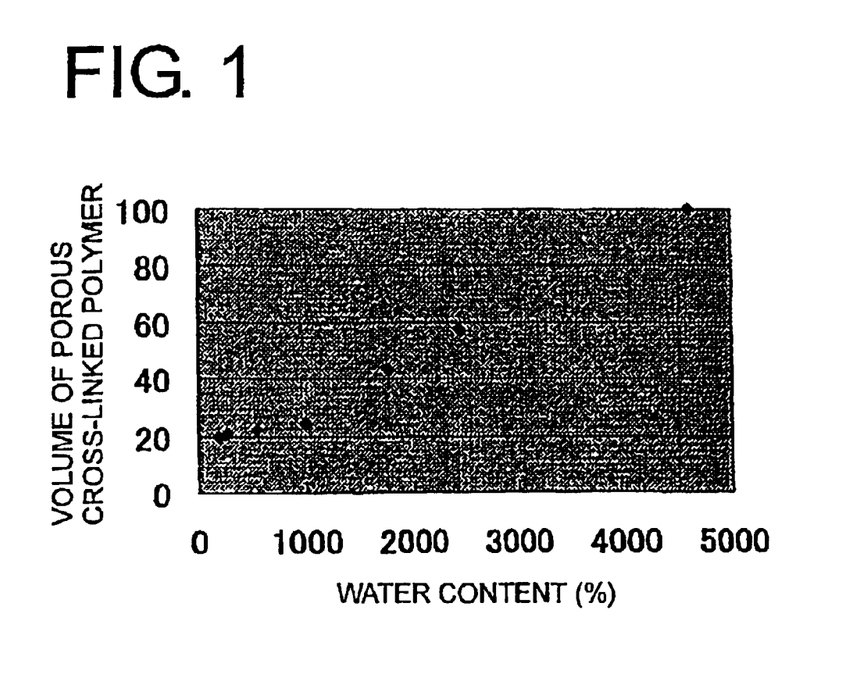
FIG. 1 is a diagram illustrating the relation between the water content and the volume of the porous cross-linked polymer when the porous cross-linked polymer is dehydrated.

Particularly, as respects the mechanism for dehydrating a porous cross-linked polymer, the squeezing, when considered physically, is capable of discharging the water from the polymer in an amount proportionate to the decrease in the volume caused by the linear pressure of the nip rolls during the initial stage thereof. Since the water which remains in the porous of the polymer relies on the capillarity to support the decrease in the volume caused by the linear pressure of the rolls, this decrease in the volume persists as permanent compression strain in the porous cross-linked polymer. This invention refers to this phase of squeezing as the first stage. As the squeezing advances, however, the elastic force of the porous cross-linked polymer grows to the extent of surpassing the permanent compression strain due to the capillarity. In this case, the polymer is caused to emit water by the compression of the nip rolls. When the polymer is relieved of the compression, it immediately expands and instantaneously retrieves the emitted water. This invention refers to this phase of squeezing as the second stage. This process of squeezing will be described below with reference to FIG. 1. FIG. 1 is a diagram illustrating the relation between the change in the water content due to the dehydration and the change in the volume of the sheet observed when a porous cross-linked polymer sheet having a water content of 4,500 (w/w)% and a thickness of 10 mm is dehydrated with the nip rolls. During the decrease of the water content from 4,500 (w/w)% to 1,000 (w/w)%, the volume decreases in accordance as the dehydration by the compression advances. This forms the first stage. As the water content falls below 1,000 (w/w)%, however, the water content is changed but the volume of the sheet is not changed. This process of the squeezing constitutes itself the second stage. It has been demonstrated that this invention, owing to the use of non-woven fabric rolls, enables the ratio of dehydration particularly in the second stage to be efficiently exalted and the relevant water content to be lowered to the extreme bottom magnitude.

Now, this invention will be described in detail below.

[I] Dehydrating Treatment (1) Non-Woven Fabric Roll Furnished with an Aspiration Mechanism The non-woven fabric rolls furnished with an aspiration mechanism and used in this invention comprise nip rolls which are liquid absorbing parts and a coat of non-woven fabric covering the surfaces of the nip rolls. They do not need to be particularly discriminated but are only required to be possessed of the construction described above.

(a) Non-Woven Fabric

The term "non-woven fabric" as used in this invention refers to a sheet-like structure of single fibers obtained not by spinning, weaving, or knitting fibers but by accumulating fibers and joining or intertwining them by means of a thermal, mechanical, or chemical action.

The fibers for forming the non-woven fabric contemplated by this invention do not need to be particularly discriminated. Synthetic fibers, plant fibers, animal fibers, glass fibers, metallic fibers, carbon fibers, ceramic fibers, and mixtures thereof can be advantageously used for the non-woven fabric. The synthetic fibers include polyamide fibers, polyester fibers, polyacrylonitrile fibers, polyvinyl alcohol fibers, polyvinyl chloride fibers, polyvinylidene chloride fibers, polyolefin fibers, Alamides fibers, and polyurethane fibers, polyethylene fibers, polypropylene fibers, polyfluoroethylene fibers, acetyl cellulose fibers, and rayon fibers, for example. The animal fibers include silk, wool, goat's hair, mohair, cashmere, alpaca, camel's hair, rabbit's hair, beaver's hair, and pig's hair, for example. The plant fibers include skin fibers of cotton, flax, and hemp and vein fibers of hemp, for example. The glass fibers are fibers extruded from molten glass and they come in two types, i.e. short fibers and long fibers.

The metallic fibers include stainless steel fibers and aluminum fibers, for example.

The ceramic fibers include silica fibers and alumina fibers, for example.

For this invention, it is preferable to use synthetic fibers and more preferable to use polyester fibers particularly from the viewpoint of thermal resistance, resistance to acids and alkalis, and durability. This invention allows these species of fibers to be used either singly or in the form of a mixture of two or more species.

The diameter of the fibers forming the non-woven fabric is properly not more than 50 deniers, preferably in the range of 0.02–10 deniers, and particularly preferably in the range of 0.02–0.4 deniers. The reason for the preferability of using such extremely thin fibers is that, during the dehydrating treatment, the initial liquid absorbing power due to the capillarity and the ability to retain the liquid absorbing power due to the transfer of the absorbed liquid can be simultaneously secured. If the size of fiber is unduly small, the fibers will be liable to betray deficiency in liquid retaining power. Conversely, if the size exceeds 50 deniers, the excess will be at a disadvantage in decreasing the empty space for admitting the absorbed liquid and quickly losing the liquid absorbing power.

The non-woven fabric can be manufactured by any of the known methods. It is obtained, for example, by preparatorily forming layers of fiber sheets and subsequently binding these layers of fiber sheets. The dry method, spun bond method, melt blow method, and wet method, for example, are available for the formation of the layer of fiber sheets. The thermal bond method, chemical bond method (impregnating method), needle punch method, and water entanglement method, for example, are available for binding the layer of fiber sheets. This invention is allowed to use any of the methods mentioned above for forming the layer of fiber sheet and use any of the methods mentioned above for bonding the layer of fiber sheets.

The liquid absorbing power of the non-woven fabric is properly not less than 1.0, preferably in the range of 1.0–15, more preferably in the range of 1.0–5.0, and particularly preferably in the range of 1.3–4.0. If the liquid absorbing power falls short of 1.0, the shortage will be at a disadvantage in lowering the initial liquid absorbing power. Conversely, if the liquid absorbing power is unduly large, the excess will be at a disadvantage in effecting dehydration, aspiration, and reabsorption insufficiently.

The "liquid absorbing power" defined by this invention is to be expressed by the ratio of increase of the mass which is determined by an experiment which comprises keeping a given non-woven fabric, 30 cm×30 cm in area, immersed in water for one hour, then squeezing the wet fabric with a mangle, performing these steps up to four repetitions, then immersing the sample fiber in water and removing it from the water, leaving the wet sample fiber on a filter paper for 3 seconds and, at the same time, allowing the filter paper to absorb the water from the surface of the fiber, and immediately determining the mass of the sample fiber. The liquid absorbing power, therefore, assumes the numerical value which is expressed as (wet mass–dry mass)/dry mass. The non-woven fabric to be used in this invention does not need to be particularly discriminated in such factors as thickness but is only required to possess the liquid absorbing power defined above.

The non-woven fabric of this invention may have a macromolecular elastic substance fill the gaps in the non-woven fabric. The reason for the presence of this macromolecular elastic substance is that it enables the whole non-woven fabric to be retained at a moderate elasticity, improves the fabric in the liquid absorbing power and the ability to retain the absorbed liquid, and stabilizes the fabric in shape.

This macromolecular elastic substance does not need to be discriminated on account of the kind of substance and the amount of the substance to be incorporated but is only required to possess liquid absorbing power of not less than 1.0, it is preferred to be polyurethane elastomer. The fiber sheet which has the macromolecular elastic substance fill the gaps in the non-woven fabric thereof can be easily obtained by any of the known methods. Specifically, the non-woven fabric containing the macromolecular elastic substance in the manner described above can be manufactured by preparing a non-woven fabric, then impregnating or coating the non-woven fabric with a solution or dispersion of a polyurethane elastomer, and finally allowing the immersed or coated non-woven fabric to undergo wet coagulation.

This invention particularly prefers a porous structure in which the voids in a non-woven fabric formed by three-dimensionally intertwining extremely thin fibers are filled with a macromolecular elastic substance. The fiber sheet of this porous structure is obtained by forming a non-woven fabric of extremely thin fibers by such a method as mixed spinning method, direct spinning method, or composite spinning method and subsequently performing the steps of decrease of diameter, impregnation with a macromolecular elastic substance, and wet coagulation in a proper order.

(b) Aspiration Mechanism

The non-woven fabric rolls to be used in this invention have the nip roll parts thereof serve as liquid absorbing parts and have the liquid absorbing parts furnished with an aspiration mechanism. The liquid absorbing parts, therefore, are shaped like rolls. The aspiration mechanism does not need to be particularly discriminated but is only required to be capable of positively aspirating liquid from the non-woven fabric. The nip rolls, for example, may be provided on the inner parts or the surface parts thereof with an aspiration mechanism connected to a negative pressure generating source. When the aspiration mechanism is installed inside, it suffices to decompress the interiors of the cylindrical shafts of the rolls.

(c) Method for Production of Non-Woven Fabric Roll

The non-woven fabric roll furnished with the aspiration mechanism and used in this invention can be produced, for example, by rolling a metallic sheet made of stainless steel and possessed of numerous through holes into a roll itself and wrapping the non-woven fabric mentioned above around the surface of the roll itself. For the purpose of uniformizing the absorption property in this case, it is permissible to apply an adhesive agent in the form of disperse dots to the surface or, when the non-woven fabric happens to contain a thermally fusible resin, in the form of a continuous layer on the surface by means of thermo-compression bonding or even by sewing a non-woven fabric to the surface. The non-woven fabric roll to be used in this invention imposes no limit on the number of layers of non-woven fabric to be wrapped around the nip roll. Nevertheless, the number of such layers is properly in the range of 1–15, preferably in the range of 1–5.

Figure 3:
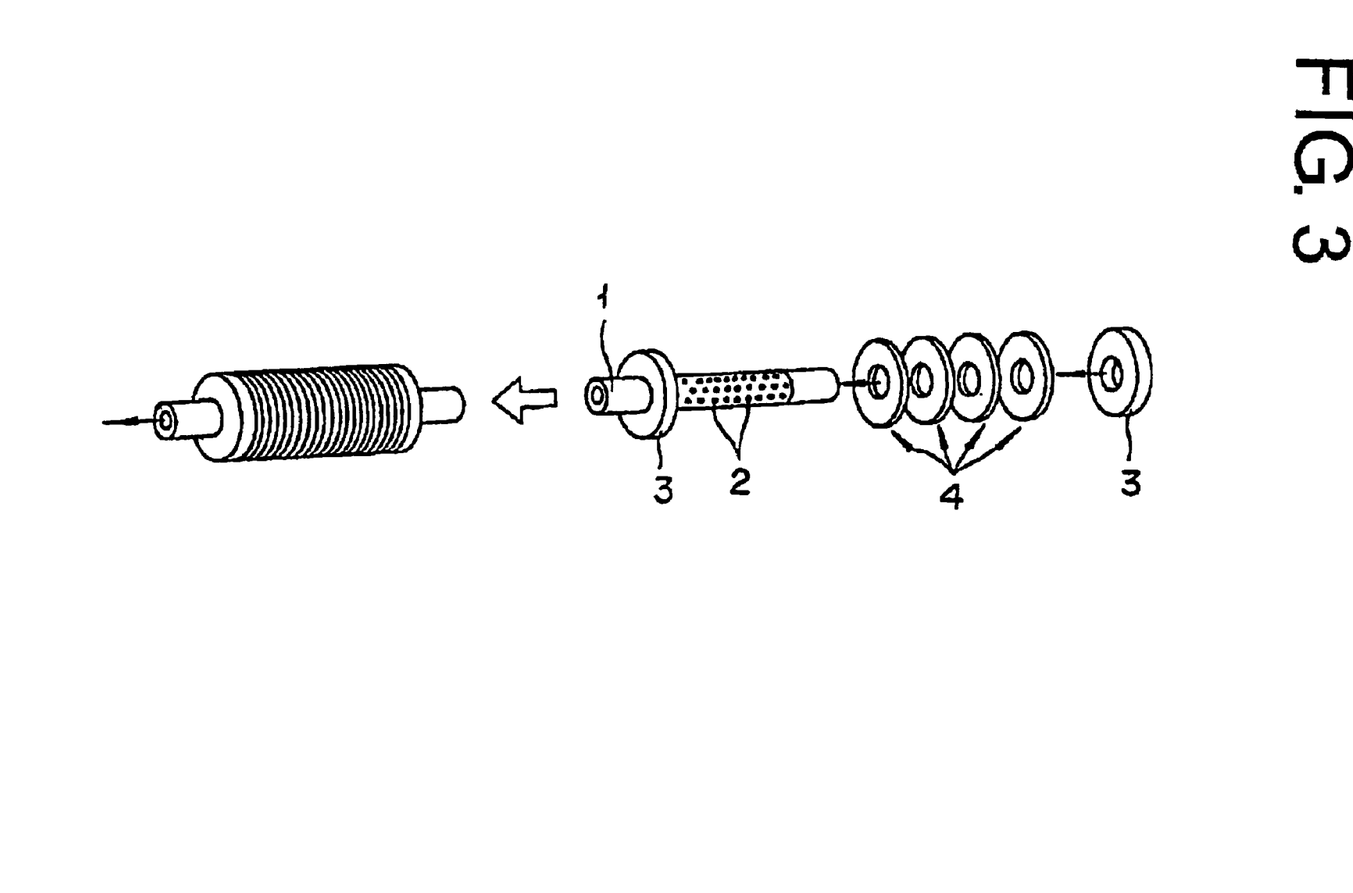
FIG. 3 is a schematic diagram illustrating the production of a non-woven fabric roll furnished with an aspiration mechanism by the use of discs cut from a non-woven fabric.

By a procedure which comprises forming a flange 3 in one terminal part of a roll itself 1 possessed of minute holes 2, inserting a plurality of non-woven fabrics 4 cut in the shape of a disc of necessary size successively around the flange 3 from the other terminal of the roll proper 1 inward, and then forming a flange in the other terminal part as illustrated in FIG. 3, it is made possible to produce a non-woven fabric roll possessed of a liquid absorbing mechanism which is composed of the two flanges and the plurality of non-woven fabric sheets. Generally, on the plurality of discs superposed in the manner described above, a pressing work is performed in the direction of superposition. Thereby dense and compact rolls are obtained. When the porous cross-linked polymer sheet is dehydrated by using a plurality of such non-woven fabric rolls, the nip rolls are allowed to use non-woven fabrics varied in kind.

When the rolls for forming the liquid absorbing parts are manufactured by superposing a plurality of discs of non-woven fabric, they are at an advantage in not only excelling in initial liquid absorbing power and ability to retain the absorbed liquid but also avoiding infliction of damage to the surface of the object under treatment. Further, they are capable of uniformly forming the roll surface because of the unnecessity for stopping the terminal parts of the non-woven fabric with an adhesive agent. Moreover, they are enabled to acquire easily an increased width and enjoy stability of shape by proportionately increasing the number of discs to be superposed and, even when the roll surface happens to sustain damage due to long use, they are enabled to acquire again a fine roll surface by saving the surface.

Even when the non-woven fabric uses extremely thin fibers, it is enabled to form very thin continuous voids so long as it is filled with a porous structure of macromolecular elastic substance. These voids give rise to the so-called phenomenon of capillarity and impart an excellent liquid absorbing power to the liquid filtering part of the roll. When the discs of the non-woven fabric are superposed to form a roll, the effect of the capillarity can be manifested to the maximum because no interrupted spot occurs in the extremely thin continuous voids in the direction of thickness of the roll.

When the non-woven fabric of the roll is composed of extremely thin fibers and a macromolecular elastic substance, the roll surface is soft and dense and capable of squeezing the article under treatment without appreciably exerting any linear pressure thereon and uniformly squeezing the object without sustaining any damage. Particularly, the fibers which are very thin are at an advantage in enabling the effect under discussion to be manifested conspicuously. When the roll formed by superposing a plurality of discs of non-woven fabric is used as a core and a sheet of a fine liquid absorbing property is wrapped around the surface of this roll, since the product consequently obtained is possessed of an outer layer part formed of the sheet, the core is protected from such troubles as developing blockage and decreasing the diameter and undulating the surface owing to a damage inflicted by the object under treatment. Thus, the core is enabled to retain the excellent liquid absorbing property over a long period of time and keep the shape of the core intact meanwhile.

(2) Method for Dehydration

Figure 2:
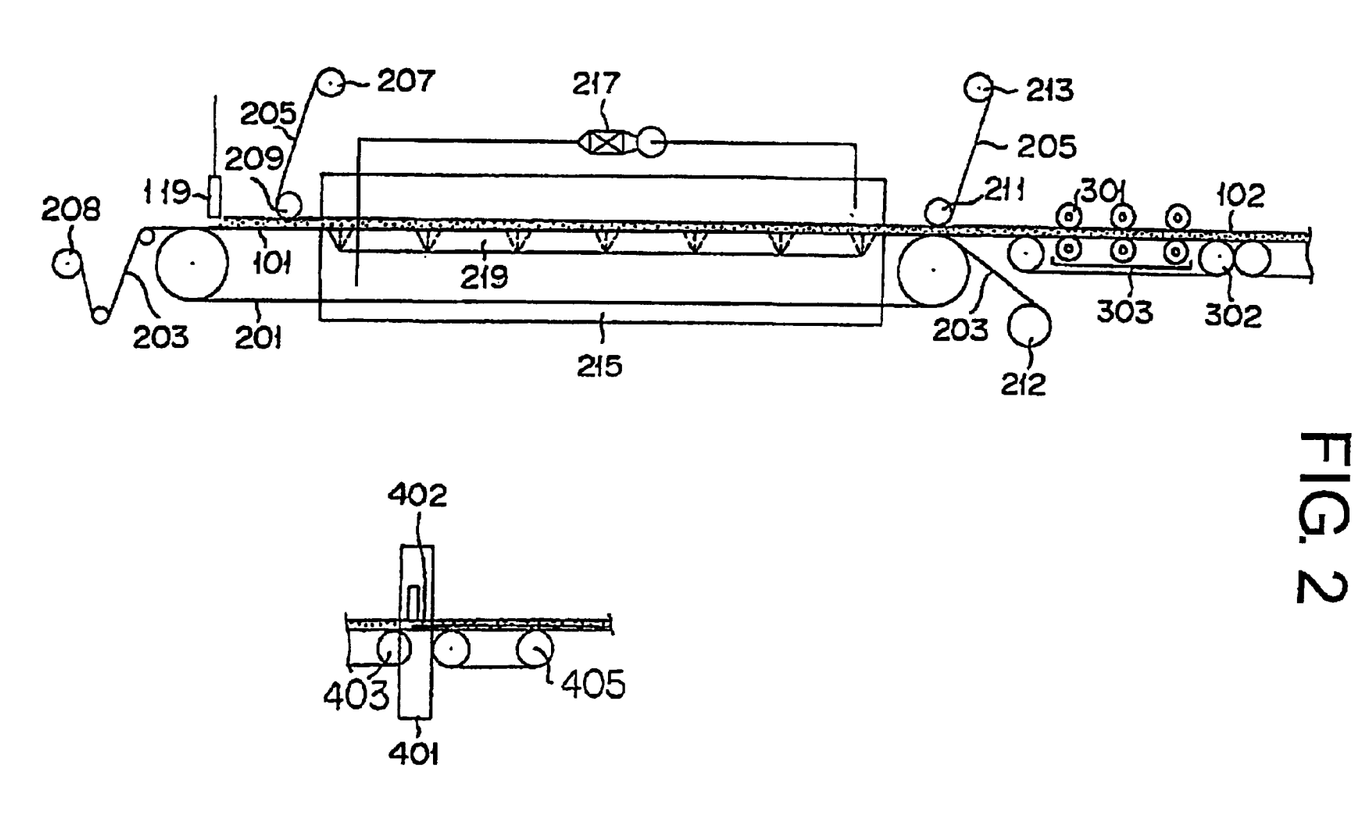
FIG. 2 is a schematic side view illustrating a typical mode of embodiment of an appropriate continuous polymerization device in a method for the production of c porous cross-linked polymer contemplated by this invention.

Now, one example of the method for the continuous process of producing the porous cross-linked polymer sheet of this invention will be described below with reference to FIG. 2. First, as illustrated in FIG. 2, an HIPE 101 is continuously supplied from an HIPE supplying device 119 onto a sheet material 203 to form a sheet of a prescribed thickness by adjusting the set height of a roller 209. The rotating speeds of unwinding and rewinding rollers 208, 212 are so controlled that the sheet material 203 may be synchronized with a conveyor belt 201. A sheet material 205, while exerting tension necessary for fixing the thickness of the HIPE 101, allows the rotating speed of itself to be controlled by the rollers 209, 211 and unwinding and rewinding rollers 207, 213. Inside a polymerization furnace 215, the HIPE 101 is polymerized by a heating means 219 formed of a hot water shower and disposed below the conveyor belt 201 and a heating means 217 formed of a hot air circulating device and disposed above the conveyor belt 201 so as to obtain a porous cross-linked polymer 102. The polymer from which the upper and lower sheet materials 203, 205 have been separated is mounted on the belt which is being revolved by a conveyor 302 in motion on the rolls of a dehydrating device 303, nipped between non-woven fabric rolls 301 disposed on and under the belt and furnished with an aspiration mechanism, and dehydrated by revolving the rolls. Optionally, the dehydrated porous cross-linked polymer 102 may be transferred to an endless band knife type slicer 401 and sliced in the direction of thickness by a band knife 402 in motion.

This invention does not need to limit the production of the porous cross-linked polymer sheet to the continuous method described above. Optionally, the porous cross-linked polymer sheet may be produced by polymerizing an HIPE batchwise in the form of a sheet and then dehydrating the sheet of the polymer or by polymerizing an HIPE batchwise and slicing the produced sheet of polymer into pieces of a proper thickness and dehydrating these slices either continuously or batchwise.

(a) Sheet Transferring Speed

The dehydration of the porous cross-linked polymer contemplated by this invention is attained by using non-woven fabric rolls furnished with an aspiration mechanism as nip rolls in the known step of dehydration resorting to nip rolls and subjecting the porous cross-linked polymer to the action of the non-woven fabric rolls. Generally, the purpose of continuously dehydrating a porous cross-linked polymer sheet is attained, for example, by continuously supplying an HIPE onto the belt of a belt conveyor in motion which is so constructed as to heat the belt surface with a heating device, forming and polymerizing the HIPE in the form of a smooth sheet on the belt, and subsequently dehydrating the produced sheet of polymer with the nip rolls mentioned above.

During the dehydration by the non-woven fabric rolls mentioned above according to this invention, the transferring speed is properly in the range of 0.5–150 m/min, preferably in the range of 2–100 m/min., and particularly preferably in the range of 5–75 m/min. Though the linear pressure of the roll during this dehydration is properly adjusted, it is preferred to be not more than 30 kg/cm. The linear pressures exerted by the individual non-woven fabric rolls used in the same line may be identical or different. If the linear pressure of a roll is unduly low, the shortage will be at a disadvantage in preventing the dehydration by physical compression from being effected fully satisfactorily. Conversely, if the linear pressure of a roll exceeds 30 kg/cm, the excess will be at a disadvantage in inflicting damage to the porous cross-linked polymer without reference to the sheet transferring speed. If the sheet transferring speed falls short of 0.5 m/min., the shortage will result directly in degrading the productivity. Conversely, if this speed exceeds 150 m/min., the excess will be at a disadvantage in lowering the efficiency of dehydration and necessitating an addition to the length of the dehydrating device.

The mechanical strength of the porous cross-linked polymer is varied by the W/O ratio of the HIPE. This invention does not need to limit the W/O ratio particularly. Properly, the W/O is not less than 3/1. It is preferably in the range of 10/1–250/1, and particularly preferably in the range of 10/1–80/1. If the W/O ratio falls short of 3/1, the shortage will induce an excessive increase in the content of the oil phase containing the polymerizing monomer and, in spite of an improvement in mechanical strength, preclude the formation of a porous cross-linked polymer sheet excelling in water retaining power per unit volume. Conversely, if the W/O ratio exceeds 250/1, the excess will possibly inflict a crack in the sheet during the course of dehydration or even compel the sheet to break asunder.

(b) Mesh Belt

This invention permits the porous cross-linked polymer to be dehydrated through the medium of a mesh belt which is disposed each on the upper and lower sides or only on the lower side of the porous cross-linked polymer interposed between the opposed non-woven fabric rolls. When the porous cross-linked polymer is dehydrated with the non-woven fabric rolls, the parts thereof which are nipped by the non-woven fabric rolls are liable to break and cleave because the linear pressure of roll is exerted on a narrow range of the porous cross-linked polymer. The intervention of the mesh belt, however, facilitates the conveyance of the porous cross-linked polymer having low strength and a high water content, alleviates the shear force exerted by the roll and the linear pressure of roll, and prevents the porous cross-linked polymer from crushing.

The mesh belt described above is produced by forming a mesh of metallic wires, synthetic resin, plant fibers, animal fibers, glass fibers, and a mixture thereof. The raw materials used for the metallic wires forming the mesh belt include stainless steel, aluminum, iron, and zinc, for example. The synthetic fibers usable for the mesh belt include polyamide resin, polyester resin, polyacrylonitrile resin, polyvinyl alcohol resin, polyvinyl chloride resin, polyvinylidene chloride resin, polyurethane resin, polyethylene resin, polypropylene resin, polyfluoroethylene resin, acetyl cellulose resin, and rayon resin, for example. The animal fibers usable for the mesh belt include silk, wool, goat's hair, mohair, cashmere, alpaca, camel's hair, rabbit's hair, beaver's hair, and pig's hair, for example. The plant fibers include skin fibers of cotton, flax, and hemp and vein fibers of hemp, for example. The glass fibers are fibers extruded from molten glass and they come in two types, i.e. short fibers and long fibers. For this invention, it is preferable to use synthetic fibers and more preferable to use polyester fibers particularly from the viewpoint of thermal resistance, resistance to acids and alkalis, and durability. This invention allows these species of fibers to be used either singly or in the form of a mixture of two or more species.

The mesh interval in the mesh belt is required to have air permeability, which is preferably not less than 5000 $ml/cm^2 \cdot min$ and particularly preferably in the range of 10000–60000 $ml/cm^2 \cdot min$. If the mesh interval falls short of 5000 $ml/cm^2 \cdot min$, the shortage will bring insufficient liquid passage.

Figure 4:
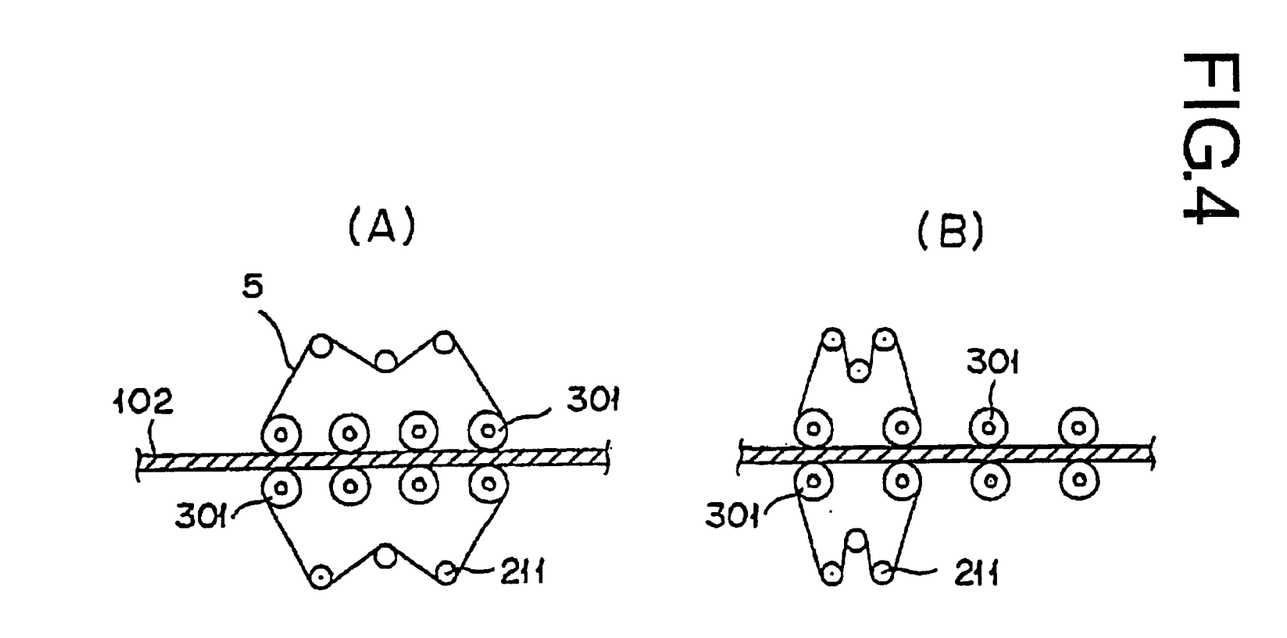
FIG. 4 is a diagram illustrating a method for using an endless mesh belt.

The width of the mesh belt may be equal to or more than the width of the sheet of porous cross-linked polymer. The mesh belt of this construction can be mounted on the porous cross-linked polymer at the time of completion of the polymerization of an HIPE. After the completion of the dehydration, it can be recovered for reuse by being rolled up. Preferably, endless mesh belts are disposed respectively on the upper and lower dehydrating rolls. The case of effecting the dehydration by the use of such endless mesh belts will be described below with reference to FIG. 4. To begin with, FIG. 4 illustrates an example of using the mesh belts in part of the step of dehydration depicted in FIG. 2. When a porous cross-linked polymer 102 is to be dehydrated with non-woven fabric rolls 301 furnished with an aspiration mechanism, the dehydration is effected with the aid of an endless belt which is passed around a plurality of rolls 301 disposed on and beneath the porous cross-linked polymer 102 and rolls 211 as illustrated in FIG. 4. The endless belt does not need to be used on all the non-woven fabric rolls 301 which are furnished with an aspiration mechanism. It may be used on part of the non-woven fabrics 301 which are possessed of an aspiration mechanism as illustrated in FIG. 4B.

(c) Two-Stage Dehydration

This invention does not impose any restriction on the number of non-woven fabric rolls to be used. In this case, the nip rolls to be used for the dehydrating treatment contemplated by this invention do not need to be invariably non-woven fabric rolls furnished with an aspiration mechanism. Optionally, the porous cross-linked polymer obtained by polymerizing an HIPE may be preparatorily dehydrated with some other nip rolls and subsequently dehydrated by using such non-woven fabric rolls are possessed of an aspiration mechanism. Properly, the ratio of dehydration after the preliminary squeezing keeps not more than 1000 (w/w)% where the initial water content is in the range of 1000–3000 (w/w)%, falls in the range of 500–2000 (w/w)% where the initial water content is in the range of 3000–7000 (w/w)%, and falls in the range of 1000–5000 (w/w)% where the initial water content is in the range of 7000–25000 (w/w)%.

As described previously with reference to FIG. 1, when the dehydration is implemented by the use of nip rolls, the mechanism for dehydration may be divided from the viewpoint of the water content into the first stage for generating permanent compression strain and the subsequent second stage. Since this invention produces an unusually fine effect particularly in the second stage of dehydration, the use in the second stage of non-woven fabric rolls furnished with an aspiration mechanism permits use of other nip rolls particularly in the first stage. The reason for the selective use only in the second stage is that it produces an extremely small effect on the final ratio of dehydration, namely on the ratio of eventual dehydration. In this respect, when the ratio of dehydration in the preliminary squeezing is fixed as a numerical value variable with the initial water content of the porous cross-linked polymer within the range mentioned above, the lower limit of the ratio of dehydration at the initial water content corresponds to the state of the first stage in the dehydration mechanism mentioned above. The water discharged from the porous cross-linked polymer contains the impurities occurring during the preparation of an HIPE and the unaltered monomer, salt, and un-crosslinked polymer. Thus, when the non-woven fabric rolls furnished with an aspiration mechanism are immediately put to use, these defiling substances adhere to the non-woven fabric and form a cause for degrading the ability of absorption, obliging the apparatus to make early stop or receive periodic inspection, and lower the efficiency of production of the porous cross-linked polymer.

Specifically, when the two-stage squeezing is implemented in the method for continuous production of a porous cross-linked polymer sheet, an operation which comprises disposing a plurality of devices of dehydrating non-woven fabric rolls 301 shown in FIG. 2, carrying out the preliminary squeezing by the first dehydrating device 303, and subsequently performing the dehydration by the use of the non-woven fabric rolls furnished with an aspiration mechanism in the second dehydrating device 303 may be adopted. Incidentally, the two-stage dehydration does not need to be limited to the continuous method described above. Optionally, the porous cross-linked polymer sheet obtained batchwise is subjected not continuously to the dehydration with the non-woven fabric rolls furnished with a preliminary squeezing mechanism and an aspiration mechanism.

The nip rolls which fit the preliminary squeezing may be selected from among a rich variety of known nip rolls. They include rubber rolls, metal rolls, nip rolls formed by coating metal rolls with a felt sheet, and non-woven fabric rolls provided with an aspiration mechanism.

The sheet transferring speed used in the preliminary squeezing, similarly to that in the formal squeezing is properly in the range of 0.5–150 m/min., preferably in the range of 2–100 m/min., and particularly preferably in the range of 5–75 m/min. The linear pressure of roll in this case, though properly adjusted, is preferred to be not more than 30 kg/cm. The linear pressures by the individual non-woven fabric rolls may be identical or different. If the linear pressure of a roll is unduly low, the shortage will be at a disadvantage in preventing the dehydration by physical compression from being effected fully satisfactorily. Conversely, if the linear pressure of a roll exceeds 30 kg/cm, the excess will be at a disadvantage in inflicting damage to the porous cross-linked polymer without reference to the sheet transferring speed. If the sheet transferring speed falls short of 0.5 m/min., the shortage will result directly in degrading the productivity. Conversely, if this speed exceeds 150 m/min., the excess will be at a disadvantage in lowering the efficiency of dehydration and necessitating an addition to the length of the dehydrating device.

When a plurality of nip rolls are used in the preliminary squeezing, the linear pressures of these rolls maybe identical or different. As regards the mesh belt mentioned above, it may be used during the course of the preliminary squeezing or the dehydration may omit using the mesh belt.

[II] Preparation of Porous Cross-Linked Polymer

Now, the porous cross-linked polymer to be dehydrated in accordance with this invention will be described below. The porous cross-linked polymer which is subjected to the dehydration contemplated by this invention is obtained by preparing an HIPE and then polymerizing the HIPE. Now, the preparation of the porous cross-linked polymer will be described below.

(1) Raw Materials Used for HIPE

The raw materials to be used for an HIPE are only required to contain (a) a polymerizing monomer, (b) a cross-linking monomer, and (c) a surfactant, as an essential component for forming an oil phase and (d) water as an essential component for forming a water phase. They may further contain, when necessary, (e) a polymerization initiator, (f) a salt, and (g) other additives as arbitrary component for forming the oil phase and/or the water phase.

(a) Polymerizing Monomer

The monomer composition essential for the composition of the HIPE mentioned above is a polymerizing monomer possessing one polymerizing unsaturated group in the molecule thereof. Though it does not need to be particularly discriminated but has only to be capable of being polymerized in a dispersion or a water-in-oil type high internal phase emulsion and allowed to form an emulsion consequently. It preferably contains a (meth)acrylic ester at least partly, more, preferably contains not less than 20 mass % of the (meth)acrylic ester, and particularly preferably contains not less than 35 mass % of the (meth)acrylic ester. When the (meth)acrylic ester is contained as a polymerizing monomer possessing one polymerizing unsaturated group in the molecule thereof proves advantageous because the produced porous cross-linked polymer abounds in flexibility and toughness.

As concrete examples of the polymerizable monomer which is used effectively in this invention, allylene monomers such as styrene; monoalkylene allylene monomers such as ethyl styrene, α-methyl styrene, vinyl toluene, and vinyl ethyl benzene; (meth) acrylic esters such as methyl (meth) acrylate, ethyl (meth)acrylate, butyl (meth)acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizable monomers may be used either singly or in the form of a combination of two or more members.

The content of the polymerizing monomer is preferred to be in the range of 10–99.9 mass %, based on the total mass of the monomer composition consisting of the polymerizing monomer and a cross-linking monomer. The reason for this range is that the produced porous cross-lined polymer is enabled to acquire pores of minute diameters. The range is more preferably 30–99 mass % and particularly preferably 30–70 mass %. If the content of the polymerizing monomer is less than 10 mass %, the produced porous cross-linked polymer will be possibly friable and deficient in water absorption ratio. Conversely, if the content of the polymerizing monomer exceeds 99.9 mass %, the porous cross-linked polymer consequently produced will be possibly deficient in strength and elastic recovery power and incapable of securing sufficient amount of water absorbed and sufficient velocity of water absorption.

(b) Cross-Linking Monomer

The other monomer composition essential for the composition of the HIPE mentioned above is a cross-linking monomer possessing at least two polymerizing unsaturated groups in the molecule thereof. Similarly to the polymerizing monomer mentioned above, it does not need to be particularly discriminated but has only to be capable of being polymerized in a dispersion or a water-in-oil type high internal phase emulsion and allowed to form an emulsion consequently.

As concrete examples of the cross-linking monomer which is effectively usable herein, aromatic monomers such as divinyl benzene, trivinyl benzene, divinyl toluene, divinyl xylene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as divinyl sulfide and divinyl sulfone; aliphatic monomers such as butadiene, isoprene, and pentadiene; and esters of polyhydric alcohols with acrylic acid or methacrylic acid such as ethylene glycol di(meth)acrylate, diethylene glycol di(meth)acrylate, triethylene glycol di(meth)acrylate, polyethylene glycol di(meth) acrylate, 1,3-butane diol di(meth)acrylate, 1,4-butane diol di(meth)acrylate, 1,6-hexane diol di(meth)acrylate, octane diol di(meth)acrylate, decane diol di(meth)acrylate, trimethylol propane di(meth)acrylate, trimethylol propane tri (meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri (meth)acrylate, dipentaerythritol tetra(meth)acrylate, N,N'-methylene bis (meth)acryl amide, triallyl isocyanurate, triallyl amine, tetraallyloxy ethane, hydroquinone, catechol, resorcinol, and sorbitol may be cited. These cross-linking monomers may be used either singly or in the form of a combination of two or more members.

The content of the cross-linked monomer is properly in the range of 0.1–90 mass %, preferably 1–70 mass %, and particularly preferably 30–70 mass %, based on the total mass of the monomer composition consisting of the polymerizing monomer mentioned above and the cross-linking monomer mentioned above. If the content of the cross-linked monomer is less than 0.1 mass %, the produced porous cross-linked polymer will possibly be deficient in strength and elastic recovery force, unable to effect absorption sufficiently per unit volume or unit mass, and incapable of securing absorption in a sufficient amount at a sufficient velocity. Conversely, if the content of the cross-linked monomer exceeds 90 mass %, the porous cross-linked polymer produced consequently will possibly be friable and deficient in water absorption ratio.

(c) Surfactant

The surfactant which is essential for the composition of the HIPE mentioned above does not need to be particularly discriminated but has only to be capable of emulsify a water phase in an oil phase forming the HIPE. It is not limited to the specific examples cited above but may be selected from the nonionic surfactants, cationic surfactants, anionic surfactants and ampholytic surfactants heretofore known to the art.

Among these surfactants, as concrete examples of the nonionic surfactant, nonyl phenol polyethylene oxide adduct; block polymer of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonyl phenyl ether; polyoxyethylene sorbitan fatty acid esters such as polyoxyethylene sorbitan monolaurate, polyoxyethylene sorbitan monomyristylate, polyoxyethylene sorbitan monopalmitate, polyoxyethylene sorbitanmonostearate, polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides may be cited. These nonionic surfactants having HLB values of not more than 10, more preferably in the range of 2–6, prove preferable. It is permissible to use two or more such nonionic surfactants in combination. The combined use possibly results in stabilizing the HIPE.

As concrete examples of the cationic surfactant, quaternary ammonium salts such as stearyl trimethyl ammonium chloride, ditallow dimethyl ammonium methyl sulfate, cetyl trimethyl ammonium chloride, distearyl dimethyl ammonium chloride, and alkylbenzyl dimethyl ammonium chloride; alkyl amine salts such as coconut amine acetate and stearyl amine acetate; alkyl betaines such as lauryl trimethyl ammonium chloride, lauryl betaine, stearyl betaine, and lauryl carboxymethyl hydroxyethylimidazolinium betaine; and amine oxides such as lauryl dimethyl amine oxide may be cited. The use of the cationic surfactant can impart excellent antibacterial properties to the porous cross-linked polymer when the polymer is used for an absorbent material, for example.

The anionic surfactant of a kind possessing an anionic moiety and an oil-soluble moiety can be advantageously used. As concrete examples of anionic surfactant, alkyl sulfates such as sodium dodecyl sulfate, potassium dodecyl sulfate, and ammonium alkyl sulfate; sodium dodecyl polyglycol ether sulfate; sodium sulforicinoate; alkyl sulfonates such as sulfonated paraffin salts; alkyl sulfonates such as sodium dodecyl benzene sulfonate, alkali metal sulfates of alkali phenol hydroxyethylene; higher alkyl naphthalene sulfonates; fatty acid salts such as naphthalene sulfonic acid formalin condensate, sodium laureate, triethanol amine oleate, and triethanol amine apiate; polyoxyalkyl ether sulfuric esters; sulfuric esters of polyoxyethylene carboxylic ester and polyoxyethylene phenyl ether sulfuric esters; succinic acid dialkyl ester sulfonates; and reactive anion emulsifiers possessed of a double bond such as polyoxy ethylene alkyl aryl sulfates may be cited. An HIPE may be prepared by using an anionic surfactant in combination with a cationic surfactant.

The combined use of the nonionic surfactant and the cationic surfactant may possibly improve the HIPE in stability.

The content of the surfactant mentioned above is properly in the range of 1–30 mass parts, preferably 3–15 mass parts, based on 100 mass parts of the total mass of the monomer composition consisting of the polymerizing monomer and the cross-linked monomer. If the content of the surfactant is less than 1 mass part, the shortage will possibly deprive of the HIPE of stability of dispersion and prevent the surfactant from manifesting the effect inherent therein sufficiently. Conversely, if the content of the surfactant exceeds 30 mass parts, the excess will possibly render the produced porous cross-linked polymer unduly friable and fail to bring a proportionate addition to the effect thereof and do any good economically.

(d) Water

The water essential for the composition of the HIPE mentioned above may be city water, purified water or deionized water. Alternatively, with a view to utilizing to advantage the waste water resulting from the production of the porous cross-linked polymer, this waste water may be adopted in its unmodified form or after undergoing a prescribed treatment.

The content of the water may be suitable selected, depending on the kind of use (such as, for example, a water absorbent material, an oil absorbent material, sound insulation material, or filter) for which the porous cross-linked polymer possessing continuous cells is intended. Since the hole ratio of the porous cross-linked polymer material is decided by varying the water phase/oil phase (W/O) ratio of the HIPE, the amount of water to be used is automatically decided by selecting the W/o ratio calculated to produce a hole ratio which conforms to the use and the purpose of the produced material.

(e) Polymerization Initiator

For the purpose of accomplishing the polymerization of an HIPE in a very short period of time as aimed at by this invention, it is advantageous to use a polymerization initiator. The polymerization initiator is only required to be suitable for use in the reversed phase emulsion polymerization. It is not discriminated between the water-soluble type and the oil-soluble type.

As concrete examples of the water-soluble polymerization initiator which is used effectively herein, azo compounds such as 2,2'-azobis(2-amidinopropane)dihydrochloride; persulfates such as ammoniumpersulfate, potassiumpersulfate, and sodiumpersulfate; peroxides such as potassiumperacetate, sodiumperacetate, sodiumpercarbonate, potassiumperacetate may be cited. As concrete example of the oil-soluble polymerization initiator which is used effectively herein, peroxide such as, cumene hydroperoxide, t-butyl hydroperoxide, t-butylperoxide-2-ethylhexyanoate di-t-butyl peroxide, diisopropyl benzene hydroperoxide, p-methane hydroperoxide, 1,1,3,3-tetramethylbutyl hydroperoxide, 2,5-dimethylhexane-2,5-dihydroperoxide, benzoyl peroxide, and methylethyl ketone peroxide may be cited. These polymerization initiators may be used either singly or in the form of a combination of two or more members.

Combined use of two or more kinds of polymerization initiator having different 10 hour half period temperatures, i.e. the temperatures at which the concentrations of the relevant initiators are halved in 10 hours proves advantageous. As a matter of course, it is permissible to use in combination the water-soluble polymerization initiator and the oil-soluble polymerization initiator.

The content of the polymerization initiator mentioned above is properly in the range of 0.05–25 mass parts, preferably 1.0–10 mass parts, based on 100 mass parts of the total mass of the monomer composition consisting of a polymerizing monomer and a cross-linking monomer, though it is variable with the combination of the polymer composition and the polymerization initiator. If the content of the polymerization initiator is less than 0.05 mass part, the shortage will be at a disadvantage in increasing the amount of the unaltered monomer component and consequently increasing the residual monomer content in the produced porous cross-linked polymer. Conversely, if the content of the polymerization initiator exceeds 25 mass parts, the excess will be at a disadvantage in rendering the polymerization difficult to control and degrading the mechanical property of the produced porous cross-linked polymer.

Alternatively, a redox polymerization initiator formed by combining the polymerization initiator mentioned above with a reducing agent may be used. In this case, the polymerization initiator to be used herein does not need to be discriminated between the water-soluble type and the oil-soluble type. It is permissible to use a water-soluble redox polymerization initiator and an oil-soluble redox polymerization initiator in combination.

In the reducing agents, as concrete examples of the water-soluble reducing agents, sodium hydrogen sulfite, potassium hydrogen sulfite, sodium thiosulfate, potassium thiosulfate, L-ascorbic acid, ferrous salts, formaldehyde sodiumsulfoxylate, glucose, dextrose, triethanol amine, and diathanol amine may be cited. As concrete examples of the oil-soluble reducing agent, dimethyl aniline, tin octylate, and cobalt naphthenate may be cited. These redox polymerization initiator type reducing agents may be used either singly or in the form of a mixture of two or more members.

The ratio of the reducing agent contained in the redox polymerization initiator mentioned above (mass ratio), i.e. the polymerization initiator (oxidizing agent)/reducing agent, is in the approximate range of 1/0.01–1/10, preferably 1/0.2–1/5.

The polymerization initiator (inclusive of the redox polymerization initiator) is only required to be present at least during the course of the polymerization of an HIPE. It may be added ① to the oil phase and/or the water phase prior to the formation of an HIPE, ② simultaneously with the formation of an HIPE, or ③ after the formation of an HIPE. In the case of the redox polymerization initiator, the polymerization initiator (oxidizing agent) and the reducing agent may be added at different times.

(f) Salt

The salt as an arbitrary component for the composition of the HIPE mentioned above may be used when it is necessary for improving the stability of the HIPE.

As concrete examples of the salt of this nature, halogenides, sulfates, nitrates, and other similar water-soluble salts of alkali metals and alkaline earth metals such as calcium chloride, sodium sulfate, sodium chloride, and magnesium sulfate may be cited. These salts may be used either singly or in the form of a combination of two or more members. Such a salt is preferred to be added in the water phase. Among salts mentioned above, polyvalent metal salts prove particularly advantageous from the viewpoint of the stability of the HIPE during the course of polymerization.

The content of the salt mentioned above is proper in the range of 0.1–20 mass parts, preferably 0.5–10 mass parts, based on 100 mass parts. If the content of the salt exceeds 20 mass parts, the excess will be at a disadvantage in suffering the waste water squeezed out of the HIPE to contain the water in an unduly large amount, boosting the cost for the disposal of the waste water, failing to bring a proportional addition to the effect, and not doing any good economically. If the content is less than 0.1 mass part, the shortage will possibly prevent the effect of the addition of the salt from being fully manifested.

(g) Other Additive

Other various kinds of additives which are capable of improving the conditions of production, the property of HIPE, and the performance of the porous cross-linked polymer by imparting the performance and the function of their own, they may be suitably used herein. For example, a base and/or a buffer may be added for the purpose of adjusting the pH value. The content of the other additives may be selected within such a range that the additives used may fully manifest the performance, function, and further the economy commensurate with the purpose of addition. As such additives, activated carbon, inorganic powder, organic powder, metallic powder, deodorant, antibacterial agent, antifungi agent, perfume and other highly polymerized compounds may be cited.

(2) Method for Preparation of HIPE

The method for production of the HIPE which can be used in this invention does not need to be particularly discriminated. Any of the methods for production of HIPE heretofore known to the art may be suitably used. A typical method for the production of interest will be specifically described below.

First, a polymerizing monomer, a cross-linking monomer, and a surfactant as essential components and further an oil-soluble polymerization initiator (inclusive of an oil-soluble redox polymerization initiator) and other additives as optional components for the formation of an oil phase prepared in respectively specified amounts mentioned above are stirred at a prescribed temperature to produce a homogeneous oil phase.

Meanwhile, water as an essential component and further a water-soluble polymerization initiator (inclusive of a water-soluble redox polymerization initiator), salts, and other additives as optional components for the formation of a water phase prepared in respectively specified amounts are stirred and heated to a prescribed temperature in the range of 30–95° C. to produce a homogeneous water phase.

Then, the oil phase which is the mixture of the monomer component, surfactant, etc. and the water phase which is the mixture of water, water-soluble salt, etc., both prepared as described above are joined, mixed and stirred efficiently for exertion of proper shearing force and induction of emulsification at the temperature for the formation of an HIPE (emulsifying temperature) which will be described specifically hereinbelow to accomplish stable preparation of an HIPE. As a means for stirring and mixing the water phase and the oil phase particularly for the table preparation of the HIPE, the method which comprises keeping the oil phase stirred and continuously adding the water phase to the stirred oil phase over a period of several minutes to some tens of minutes. Alternatively, the HIPE aimed at may be produced by stirring and mixing part of the water phase component and the oil phase component thereby forming an HIPE resembling yogurt and continuing the stirring and mixing operation while adding the remaining portion of the water phase component to the yogurt-like HIPE.

(3) Water Phase/Oil Phase (W/O) Ratio

The water phase/oil phase (W/O) ratio (by mass ratio) of the HIPE obtained as described above does not need to be particularly discriminated but may be properly selected, depending on the purpose of use of the porous cross-linked polymer possessed of open cells (such as, for example, water absorbent material, oil absorbent material, sound insulation material, and filter). As defined above, it is properly not less than 3/1, preferably in the range of 10/1–250/1, and particularly preferably in the range of 10/1–80/1.

(4) Apparatus for Production of HIPE

The apparatus for the production of the HIPE mentioned above does not need to be particularly discriminated. Any of the apparatuses for the production of the porous cross-linked polymer material which have been heretofore known to the art maybe used. For example, the stirring device (emulsifier) to be used for mixing and stirring the water phase and the oil phase may be selected from among the stirring devices and the kneading devices which have been heretofore known to the art. As concrete examples of the stirring device, stirring devices using vanes of the propeller type, the paddle type, and the turbine type, homomixers, line mixers, and pin mills may be cited.

(5) Temperature for Forming HIPE

The temperature for forming an HIPE is generally in the range of 20–110° C. From the viewpoint of the stability of the HIPE, the temperature is preferably in the range of 30–105° C., more preferably 40–100° C. If the temperature for forming the HIPE is less than 20° C., the shortage will possibly result in unduly elongating the time for heating, depending on the temperature of hardening. Conversely, if the temperature exceeds 110° C., the excess will possibly result in degrading the stability of the formed HIPE. Incidentally, it is commendable to adjust preparatorily the temperature of the oil phase and/or the water phase to the prescribed emulsifying temperature and then stir and mix the two phases till emulsification and form the HIPE as expected. Since the preparation of the HIPE uses the water phase in a larger amount, the preparatory adjustment of the temperature of at least the water phase to the prescribed emusifying temperature may well be rated as more favorable. If the polymerizing monomer or the cross-linking monomer begins to polymerize and forms a polymer while the emulsification is in progress, the formed polymer will possibly impair the stability of the HIPE. When a polymerization initiator (inclusive of a redox polymerization initiator) is incorporated in the raw material for the preparation of the HIPE, therefore, the emulsifying temperature of the HIPE is preferred to be incapable of inducing the polymerization initiator (oxidizing agent) to undergo substantial thermal decomposition enough to initiate polymerization of the HIPE. More preferably, the emulsifying temperature is lower than the temperature at which the half-life of the polymerization initiator (oxidizing agent) is 10 hours (10-hour half-life temperature).

(6) Formation of HIPE

The HIPE prepared as described above is formed in a necessary shape before the monomer in the HIPE is polymerized. In this invention, the HIPE to be formed can be supplied batchwise or continuously to the site of formation. Here, the term "continuously" refers to the operation of continuously supplying the produced HIPE to the forming device and subsequently polymerizing it continuously in the polymerizing device and the term "batchwise" refers to the operation of forming and polymerizing the whole amount of the HIPE produced.

Since the continuous method which continuously forming and polymerizing the HIPE enjoys high productivity and permits the dehydration thereof to be continuously performed, it is at an advantage in enabling the method of production contemplated by this invention to be utilized most effectively. Specifically, the method for continuous production of a porous cross-linked polymer sheet comprises continuously supplying an HIPE onto the belt of a running belt conveyor of such a construction as to heat the surface of the belt with a heating device and then simultaneously forming and polymerizing the HIPE into a smooth sheet on the belt. When the surface of the conveyor for contact with the emulsion is smooth, a continuous sheet of the polymer can be obtained in a necessary thickness by supplying the HIPE in a prescribed thickness onto the belt.

The production of the porous cross-linked polymer in a three-dimensional shape can be attained by cast polymerization, i.e. a method which comprises casting an HIPE into a female die of the shape mentioned above and polymerizing the HIPE in the female die. Incidentally, the cast polymerization may be implemented by the batchwise method mentioned above or by the continuous method which uses the die adapted to remain in a continuous motion during the course of operation.

Properly, the HIPE is tightly sealed with a film of PET, for example, so as to keep the surface of the HIPE from contacting the ambient air. The reason for the desirability of the tight seal is that the surface of the HIPE, on being exposed to the ambient air, can no longer maintain the porous thereof and the produced porous cross-linked polymer will be possibly deficient in the water absorbing property. This tight seal is opened after the polymerization of the HIPE is completed.

(7) Polymerization of HIPE (a) Addition of Polymerization Initiator

The HIPE begins to polymerize in consequence of the addition of a polymerization initiator and the application of heat. The polymerization initiator is added ① to the water phase and/or the oil phase and mixed therewith before the formation of an HIPE, ② simultaneously with the formation of the HIPE, or ③ after the formation of the HIPE. In the case of ②, the redox polymerization initiator system may be used for the same reason as described above in ①, i.e. the method for the formation of an HIPE.

In this case, the preliminary addition is conveniently made to the oil phase when the polymerization initiator or the reducing agent is soluble in oil or to the water phase when it is soluble in water. A method of adding to the water phase an emulsion of the oil-soluble polymerization initiator (oxidizing agent) or the reducing agent, for example, is also conceivable. The polymerization initiator may be used in an undiluted form or in the form of a solution or dispersion in water or an organic solvent. When the addition is made simultaneously with or subsequently to the formation of an HIPE, it is commendable for the sake of preventing the monomer component from being polymerized unevenly to ensure quick and uniform mixture of the added polymerization initiator.

The HIPE which has incorporated the polymerization initiator therein is promptly introduced into a polymerization vessel which is a polymerization device or into a continuous polymerization device. It is commendable to insert a route for introducing a reducing agent or an oxidizing agent or other polymerization initiator in a route emanating from an emulsifier for preparing the HIPE and reaching a polymerization vessel or a continuous polymerization device and add the polymerization initiator via the added route to the HIPE and mix them in a line mixer.

(b) Polymerization Temperature and Polymerization Time

The polymerization temperature of HIPE is generally in the range of normal room temperature to 150° C. and, from the standpoint of stability of the HIPE and the polymerization speed, preferably in the range of 60–110° C., more preferably in the range of 80–110° C., and particularly preferably in the range of 90–100° C. If the polymerization temperature falls short of the normal room temperature, the shortage will be at a disadvantage in requiring an unduly long time for the polymerization and possibly rendering commercial production infeasible. Conversely, if the polymerization temperature exceeds 150° C., the excess will be possibly at a disadvantage in compelling the produced porous cross-linked polymer to acquire pores of a uniform diameter and betray deficiency in strength. The polymerization temperature may be varied in two stages or in more stages during the course of the polymerization. This invention does not exclude the polymerization which is performed in this manner.

The polymerization time of an HIPE is generally in the range of one minute to 20 hours, preferably within one hour, more preferably within 30 minutes, and particularly preferably in the range of one to 20 minutes. If the polymerization time exceeds 20 hours, the excess will be possibly at a disadvantage commercially in degrading the productivity. Conversely, if the polymerization time falls short of one minute, the shortage will be possibly at a disadvantage in preventing the porous cross-linked polymer from acquiring fully satisfactory strength. Of course, this invention does not exclude adoption of a polymerization time longer than the upper limit of the range mentioned above.

The polymer consequently obtained is cooled, possibly gradually, to an expected temperature, though not necessarily optionally, the porous cross-linked polymer thus obtained may be subjected to the dehydration, the slicing, or the after treatment such as washing and compression without being cooled. When the porous cross-linked polymer retains mechanical strength enough to withstand the dehydration or the slicing, the polymerizing monomer contained in the RIPE does not need to have completed polymerization. In this case, the polymerization of the monomer may be attained by heating the porous cross-linked polymer subsequently to the dehydration or the slicing.

When the produced porous cross-linked polymer is to be sliced prior to the dehydration into pieces of an expected thickness, any of the known devices heretofore adopted for the slicing under discussion may be used in its unmodified form. Generally, the porous cross-linked polymer which has undergone the dehydration is sliced by rotating a saw tooth nipped between guides. The motion of the saw tooth does not need to be limited to the rotation but may be produced longitudinally, laterally, or vertically. The guides may be absent in this case.

(c) Polymerization Device

The polymerization device which can be used in this invention does not need to be particularly discriminated. A belt conveyor type continuous polymerization device provided with a temperature adjusting unit or a continuous casting type polymerizing device, for example, may be used. As described already in the paragraph covering the formation of an HIPE, the continuous method which simultaneously forms and polymerizes an HIPE continuously may utilize a device so constructed as to heat the surface of the belt of a belt conveyor with a heating device and adapted to supply continuously the HIPE onto the belt in motion and form and polymerize the HIPE into a smooth sheet on the belt. Naturally, a batch type polymerization column or a batch type cast polymerization device may be used as occasion demands.

The polymerization of an HIPE in a batch operation is effected, for example, by introducing the HIPE into a cylindrical polymerization vessel and externally applying heat to the polymerization vessel. The purpose of obtaining the porous cross-linked polymer in the form of sheet, however, is fulfilled by slicing a cylindrically formed porous cross-linked polymer in a prescribed thickness with a known peeling machine thereby obtaining an elongate sheet in advance.

(d) Porous Cross-Linked Polymer

The thickness of the porous cross-linked polymer to be dehydrated in this invention is preferably not more than 100 mm, more preferably in the range of 0.5–50 mm, and particularly preferably in the range of 0.5–30 mm. The reason for this range is that when the thickness is in this range, the eventual water content can be lowered uniformly even to the center of the sheet to a very bottom level as described above. Even when the porous cross-linked polymer is produced by polymerizing an HIPE in a batch operation, therefore, it is sliced with the peeling machine in a thickness in the range of 0.5–100 mm.

The porous cross-linked polymer consequently obtained generally has a water content in the range of 300–25000 w/w %.

[III] Other Treatments for Porous Cross-Linked Polymer Sheet

The porous cross-linked polymer sheet of this invention is a sheet which is obtained by the dehydration carried out by the method described above. Optionally, it may be subjected to some other treatments before or after the dehydration. The treatments which can be performed include a compressing treatment, washing treatment, drying treatment, impregnation treatment intended to impart prescribed characteristic properties, and slicing treatment, for example. These treatments may be performed at any proper stage after the preparation of the porous cross-linked polymer to suit the purpose.

(a) Washing Treatment

For the purpose of improving the surface condition of a porous cross-linked polymer sheet, for example, the porous cross-linked polymer may be washed with purified water or an aqueous solution containing an arbitrary additive or a solvent. The porous cross-linked polymer sheet which has been washed can be dehydrated by the method of dehydration mentioned above. The water content eventually attained in the dehydrated sheet may be arbitrarily selected to suit the purpose for which the dehydrated sheet is used.

(b) Drying Treatment

The porous cross-linked polymer sheet produced by this invention, when necessary, may be dried by being heated with hot wind or microwave and may have the water content thereof adjusted by means of moistening.

(c) Impregnating Treatment

The porous cross-linked polymer sheet may be endowed with functionality by the impregnating treatment using such additives as detergent, perfume, deodorant, and antifungal agent.

(d) Compressing Treatment

The porous cross-linked polymer sheet of this invention can be compressed into a form measuring one of several parts of the original thickness. The porous cross-linked polymer compressed in the form of a sheet has a small volume as compared with the original porous cross-linked polymer and permits a reduction in the cost of transportation and storage. The porous cross-linked polymer in the compressed form, on contacting a large volume of water, manifests the character of absorbing water and resuming the original thickness. It is characterized by acquiring a faster water absorbing speed than the polymer of the original thickness.

For the impartation of the compressed form, it suffices to use a compressing means which conforms to the shape of the porous cross-linked polymer to be compressed so as to exert pressure uniformly on the porous cross-linked polymer throughout the entire volume thereof and compress it evenly. Particularly, for the production of the porous cross-linked polymer in the form of sheet, it suffices to pass the slices cut from the polymer between rolls or belts which are opposed to each other across an interval adjusted in advance to a prescribed distance. At the step of this compression, the temperature at which the porous cross-linked polymer is compressed is preferred to be higher than the glass transition temperature of the porous cross-linked polymer. If this temperature is lower than the glass transition temperature of the porous cross-linked polymer, the shortage will possibly result in breaking the porous structure or varying the pore diameter. From the viewpoint of saving the space necessary for transportation and storage and facilitating the ease of handling, it is effective to make the compression to below one half of the original thickness. Preferably, the compression is made to below ¼ of the original thickness. When the sheet of the porous cross-linked polymer at the end of the dehydrating step acquires a thickness falling in the prescribed range, there is no need for installing any new compresing step.

EXAMPLES

Now, this invention will be specifically described below with the aid of working examples.

Production Example 1

A fibrous sheet having a liquid absorbing power of 2.3 was obtained by filling the gaps in a non-woven fabric formed by multidimensionally intertwining 200 mass parts of polyester fibers having an extremely small thickness of 0.1 denier with a porous structure formed of 100 mass parts of polyurethane. A multiplicity of discs punched out of the fibrous sheet were inserted side by side around a metallic shaft provided with an aspiration mechanism to form a roll. The roll had the terminals thereof fixed by application of pressure of 50 kg/cm$^2$ and the surface thereof subsequently polished to produce a non-woven fabric roll provided with the aspiration mechanism. This non-woven fabric roll was set in position in a dehydrating device.

Production Example 2

A fibrous sheet having liquid absorbing power of 5.5 was obtained by intertwining multidimensionally a mixture of 100 mass parts of 1-denier polyester fibers and 100 mass parts of 5-denier polyester fibers. A multiplicity of discs punched out of the fibrous sheet were inserted side by side around a metallic shaft provided with an aspiration mechanism to form a roll. The roll had the terminals thereof fixed by application of pressure of 50 kg/cm$^2$ and the surface thereof subsequently polished to produce a non-woven fabric roll provided with the aspiration mechanism. This non-woven fabric roll was set in place in a dehydrating device.

Production Example 3

A fibrous sheet having liquid absorbing power of 6.0 was obtained by intertwining multidimensionally a mixture of 100 mass parts of 1-denier polyethylene terephthalate fibers and 100 mass parts of 5-denier polyethylene terephthalate fibers. This fibrous sheet was wrapped around the surface of a metallic shaft provided with an aspiration mechanism to produce a non-woven fabric roll provided with the aspiration mechanism. This non-woven fabric roll was set in place in a dehydrating device.

Example 1

An oil phase was prepared by adding 0.4 mass part of diglycerin monooleate to a mixture of 5.0 mass parts of 2-ethylhexyl acrylate and 3.0 mass parts of 55% divinyl benzene and dissolving them altogether uniformly. Separately, a water phase was prepared by dissolving 8.0 mass parts of calcium chloride and 0.2 mass part of potassium persulfate in 369.8 mass parts of purified water and then heated to 65° C. An HIPE was formed by continuously supplying the oil phase and the water phase at a ratio of 1/45 to a dynamic mixing device and mixed and emulsified therein. This HIPE was introduced into a polymerization column and polymerized therein at a temperature of 65° C. for 16 hours to obtain a shaped porous cross-linked polymer. This polymer was extracted from the polymerization column and sliced into pieces 5 mm in thickness. The slices were dehydrated under the conditions shown in Table 1. The results are shown in Table 1.

With reference to Table 1, in the bracket classifying the non-woven fabric in kind, A denotes a sample of Production Example 1, B denotes a sample of Production Example 2, C denotes a sample of Production Example 3 respectively, D denotes a sample using opposed rolls each formed by wrapping a rubber sheet around a metallic roll (not provided with an aspiration mechanism), and E a sample using opposed stainless steel rolls including a lower roll which was provided therein with a suction box as an accessorial item.

Examples 2–4 and Comparative Examples 1–3

The porous cross-linked polymers obtained by the procedure of Example 1 were dehydrated under the varying conditions shown in Table 1. The results are shown in Table 1.

The samples which used non-woven fabric in their dehydrating rolls invariably showed satisfactory results as evinced by low final water contents. In Comparative Examples 2 and 3, samples (E) using opposed stainless steel rolls including a lower roll provided therein with a suction box as an accessorial item and consequently adding to the number of rolls and allowing further squeezing brought virtually no charge in the final water contents.

TABLE 1

|  | Example | | | | Comparative Example | | |
| --- | --- | --- | --- | --- | --- | --- | --- |
|  | 1 | 2 | 3 | 4 | 1 | 2 | 3 |
| W/O ratio | 45/1 | 45/1 | 45/1 | 45/1 | 45/1 | 45/1 | 45/1 |
| Water content (w/w %) | 4500 | 4500 | 4500 | 4500 | 4500 | 4500 | 4500 |
| Thickness of polymer (mm) | 5 | 5 | 5 | 5 | 5 | 5 | 5 |
| Kind of roll/number of pairs of rolls | A/3 | B/3 | C/3 | C/1 A/2 | D/3 | E/3 | E/15 |
| Linear pressure of roll (kg/cm) | 9 | 9 | 9 | 9 | 9 | 9 | 9 |
| Transferring speed (m/min.) | 7 | 7 | 7 | 7 | 7 | 7 | 7 |
| Final water content (w/w %) | 90 | 110 | 240 | 100 | 1300 | 550 | 490 |

Example 5

An oil phase was prepared by adding 0.4 mass part of diglycerin monooleate to a mixture of 5.0 mass parts of 2-ethylhexylacrylate and 3.0 mass parts of 55% divinylbenzene and dissolving them altogether uniformly. Separately, a water phase was prepared by dissolving 8.0 mass parts of calcium chloride and 0.2 mass part of potassium persulfate in 285.8 mass parts of purified water and then heated to 65° C. An HIPE was formed by continuously supplying the oil phase and the water phase at a ratio of 1/35 to a dynamic mixing device and mixed and emulsified therein.

This HIPE was polymerized by a continuous polymerization device comprising an endless steel belt and an upper and a lower PET film at a temperature of 95° C. for 10 minutes at a speed of 7 m/min and formed in a shape 35 mm in thickness. Then, the upper and lower PET films were separated by a reeling motion. The denuded polymer layer was dehydrated under the conditions shown in Table 2. The results are shown in Table 2. In Table 2, the classification of rolls by kind is made in the same manner as in Table 1.

Examples 6–8 and Comparative Example 4 and 5

The porous cross-linked polymers obtained by the procedure of Example 5 were dehydrated under the varying conditions shown in Table 2. The results are shown in Table 2.

The samples of Examples 5–8 which used non-woven fabric rolls invariably effected dehydration with high efficiency. In contrast, the samples of Comparative Examples 4 and 5 which used no non-woven fabric roll required rolls in a large number and showed only low final water contents.

TABLE 2

|  | Example | | | | Comparative Example | |
| --- | --- | --- | --- | --- | --- | --- |
|  | 5 | 6 | 7 | 8 | 4 | 5 |
| W/O ratio | 35/1 | 35/1 | 35/1 | 35/1 | 35/1 | 35/1 |
| Water content (w/w %) | 3500 | 3500 | 3500 | 3500 | 3500 | 3500 |
| Thickness of polymer (mm) | 35 | 35 | 35 | 35 | 35 | 35 |
| Kind of roll/number of pairs of rolls | A/5 | B/5 | C/6 | C/3 A/3 | D/30 | E/30 |
| Transferring speed (m/min.) | 7 | 7 | 7 | 7 | 7 | 7 |
| Final water content (w/w %) | 250 | 310 | 390 | 260 | 1000 | 720 |

Examples 9 and 10 and Comparative Example 6

An oil phase was prepared by adding 0.4 mass part of diglycerin monooleate to a mixture of 5.0 mass parts of 2-ethylhexyl acrylate and 3.0 mass parts of 55% divinyl benzene and dissolving them altogether uniformly. Separately, a water phase was prepared by dissolving 8.0 mass parts of calcium chloride and 0.2 mass part of potassium persulfate in 453.8 mass parts of purified water and then heated to 65° C. An HIPE was formed by continuously supplying the water phase and the oil phase at a ratio of 65/1 to a dynamic mixing device and mixed and emulsified therein.

This HIPE was polymerized by a continuous polymerization device comprising an endless steel belt and an upper and a lower PET film at a temperature of 95° C. for 10 minutes at a speed of 15 m/min and formed in a shape 10 mm in thickness. Then, the upper and lower PET films were separated by a reeling motion. The denuded polymer layers were gradually squeezed with varying dehydrating rolls shown in Table 3 to compare the final water contents. The results are shown in Table 3. In Table 3, the classification of rolls by kind is made in the same manner as in Table 1.

In the dehydration of a porous cross-linked polymer which had a high W/O ratio and was exceedingly susceptible of collapse, when the porous cross-linked polymer was squeezed without interposing a mesh belt between the porous cross-linked polymer and the dehydrating rolls, it was necessary to effect this squeezing gradually, increase the number of rolls required to be used, and keep the operating speed of the squeezing line from being increased for the purpose of preventing the porous cross-linked polymer from breaking. The samples having a mesh belt interposed between the porous cross-linked polymer and the dehydrating rolls permitted the squeezing to proceed efficiently without entailing occurrence of a crack or a break and attained satisfactorily low final water contents.

TABLE 3

|  | Example | | Comparative Example |
|---|---|---|---|
|  | 9 | 10 | 6 |
| W/O ratio | 65/1 | 65/1 | 65/1 |
| Water content (w/w%) | 6500 | 6500 | 6500 |
| Thickness of polymer (mm) | 10 | 10 | 10 |
| Presence/absence of mesh | None | Used | None |
| Kind of roll/number of pairs of rolls | A/7 | A/5 | A/5 |
| Transferring speed (m/min.) | 0.5 | 15 | 15 |
| Final water content (w/w %) | 240 | 250 | — |
| Remark | No crack | No crack | Crack occurred |

Examples 11–13 and
Comparative Examples 7 and 8

An oil phase was prepared by adding 0.4 mass part of diglycerin monooleate to a mixture of 5.0 mass parts of 2-ethylhexyl acrylate and 3.0 mass parts of 55% divinyl benzene and dissolving them altogether uniformly. Separately, a water phase was prepared by dissolving 8.0 mass parts of calcium chloride and 0.2 mass part of potassium persulfate in 369.8 parts of purified water and then heated to 65° C. An HIPE was formed by continuously supplying the water phase and the oil phase at a ratio of 45/1 to a dynamic mixing device and mixed and emulsified therein. This HIPE was polymerized by a continuous polymerization device comprising an endless steel belt and an upper and a lower PET film at a temperature of 95° C. for 10 minutes at a speed of 10 m/min and formed in a shape 10 mm in thickness. Then, the upper and lower PET films were separated by a reeling motion. The denuded polymer layers were squeezed with varying dehydrating rolls shown in Table 4. The results are shown in Table 4. In Table 4, the classification of rolls by kind is made in the same manner as in Table 1. The durability was rated on a three-point scale, wherein ○ denotes the absence of a discernible sign of decline in the dehydrating capacity due to continuous operation, Δ denotes a slight decline of the dehydrating capacity due to continuous operation to an extent of necessitating backwash, and x denotes occurrence of clogging due to continuous operation.

The results indicate that the combination of preliminary squeezing and non-woven fabric rolls lowered final water content and imparted outstanding durability to the non-woven fabric rolls.

TABLE 4

|  | Example | | | Comparative Example | |
|---|---|---|---|---|---|
|  | 11 | 12 | 13 | 7 | 8 |
| W/O ratio | 45/1 | 45/1 | 45/1 | 45/1 | 45/1 |
| Water content (w/w %) | 4500 | 4500 | 4500 | 4500 | 4500 |
| Thickness of polymer (mm) | 10 | 10 | 10 | 10 | 10 |
| Preliminary squeezing | | | | | |
| Kind of roll/number of pairs of rolls | E/15 | E/15 | — | E/15 | E/15 |
| Mesh sheet | Attached to all rolls | Attached to all rolls | — | None | Attached to all rolls |
| Transferring speed (m/min.) | 10 | 10 | — | 10 | 10 |
| Final water content (w/w %) | 1000 | 1000 | — | — (Crack occurred) | 1000 |
| Dehydrating treatment | | | | | |
| Kind of roll/number of pairs of rolls | A/3 | B/3 | A/5 | — | — |
| Mesh sheet | None | None | Attached up to 3rd roll | — | — |
| Transporting speed (m/min) | 10 | 10 | 10 | — | — |
| Final water content (w/w %) | 180 | 240 | 190 | — | — |
| Durability rated | ○ | ○ | Δ | — | ○ |

Examples 14–16 and Comparative Example 9

An oil phase was prepared by adding 0.4 mass part of diglycerin monooleate to a mixture of 5.0 mass parts of 2-ethylhexyl acrylate and 3.0 mass parts of 55% divinyl benzene and dissolving them altogether uniformly. Separately, a water phase was prepared by dissolving 8.0 mass parts of calcium chloride and 0.2 mass part of potassium persulfate in 411.8 parts of purified water and then heated to 65° C. An HIPE was formed by continuously supplying the water phase and the oil phase at a ratio of 55/1 to a dynamic mixing device and mixed and emulsified therein. This HIPE was polymerized by a continuous polymerization device comprising an endless steel belt and an upper and a lower PET film at a temperature of 95° C. for 10 minutes at a speed of 10 m/min and formed in a shape 25 mm in thickness. Then, the upper and lower PET films were separated by a reeling motion. The denuded polymer layers were squeezed with varying dehydrating rolls shown in Table 5. The results are shown in Table 5. In Table 5, the classification of rolls by kind is made in the same manner as in Table 1 and the durability is rated in the same manner as in Table 4. The results indicate that the combination of preliminary squeezing and non-woven fabric rolls lowered final water content and imparted outstanding durability to the non-woven fabric rolls.

TABLE 5

|  | Example | | | Comparative Example |
|---|---|---|---|---|
|  | 14 | 15 | 16 | 9 |
| W/O ratio | 55/1 | 55/1 | 55/1 | 55/1 |
| Water content (w/w %) | 5500 | 5500 | 5500 | 5500 |
| Thickness of polymer (mm) | 25 | 25 | 25 | 25 |
| | uz,12/21 Preliminary squeezing | | | |
| Kind of roll/number of pairs of rolls | E/30 | E/30 | — | E/30 |
| Mesh sheet | Attached to all rolls | Attached to all rolls | — | Attached to all rolls |
| Transferring speed (m/min.) | 10 | 10 | — | 10 |
| Final water content (v/v%) | 1100 | 1100 | 1100 | |
| | Dehydrating treatment | | | |
| Kind of roll/number of pairs of rolls | A/5 | B/5 | A/6 | — |
| Mesh sheet | None | None | Attached up to 3rd roll | — |
| Transporting speed (m/min.) | 10 | 10 | 10 | — |
| Final water content (w/w %) | 190 | 290 | 220 | |
| Durability rated | ◯ | ◯ | Δ | ◯ |

INDUSTRIAL APPLICABILITY

In accordance with this invention, the use of non-woven fabric rolls furnished with an aspiration mechanism enables a porous cross-linked polymer to be dehydrated to an extremely low water content. In order for the conventional method to acquire this low water content, it generally necessitates an increase in the linear pressure of roll and consequently induces the porous cross-linked polymer to sustain fracture.

What is claimed is:

1. A method for the production of a porous cross-linked polymer sheet, comprising the steps of forming and polymerizing a water-in-oil type high internal phase emulsion thereby obtaining a porous cross-linked polymer and dehydrating the porous cross-linked polymer by using a non-woven fabric roll furnished with an aspiration mechanism.

2. A method according to claim 1, wherein the non-woven fabric used in said non-woven fabric roll possesses a liquid absorbing power of not less than 1.0.

3. A method according to claim 1, wherein the porous cross-linked polymer is subjected to preliminary squeezing and thereafter to the dehydration by the use of a non-woven fabric roll furnished with an aspiration mechanism.

4. A method according to claim 1, wherein a mesh belt is interposed between the porous cross-linked polymer and the dehydrating roll during the dehydration by the use of a non-woven fabric roll furnished with an aspiration mechanism or during the preliminary squeezing or subsequent dehydration by the use of a non-woven fabric roll furnished with an aspiration mechanism.

5. A method according to claim 2, wherein the porous cross-linked polymer is subjected to preliminary squeezing and thereafter to the dehydration by the use of a non-woven fabric roll furnished with an aspiration mechanism.

6. A method according to claim 2, wherein a mesh belt is interposed between the porous cross-linked polymer and the dehydrating roll during the dehydration by the use of a non-woven fabric roll furnished with an aspiration mechanism or during the preliminary squeezing or subsequent dehydration by the use of a non-woven fabric roll furnished with an aspiration mechanism.

7. A method according to claim 3, wherein a mesh belt is interposed between the porous cross-linked polymer and the dehydrating roll during the dehydration by the use of a non-woven fabric roll furnished with an aspiration mechanism or during the preliminary squeezing or subsequent dehydration by the use of a non-woven fabric roll furnished with an aspiration mechanism.

8. A method according to claim 6, wherein the porous cross-linked polymer is subjected to preliminary squeezing and thereafter to the dehydration by the use of a non-woven fabric roll furnished with an aspiration mechanism.

* * * * *